United States Patent
Drum et al.

(10) Patent No.: US 8,727,052 B2
(45) Date of Patent: May 20, 2014

(54) DRY AXLE CENTER SECTION

(75) Inventors: Carolyn Lambka Drum, Dubuque, IA (US); Christopher M. Ruden, Peosta, IA (US); Kinte Allen, Dubuque, IA (US); Mark Cherney, Potosi, WI (US)

(73) Assignee: Deere & Company, Moline, IL (US)

( * ) Notice: Subject to any disclaimer, the term of this patent is extended or adjusted under 35 U.S.C. 154(b) by 562 days.

(21) Appl. No.: 13/034,121

(22) Filed: Feb. 24, 2011

(65) Prior Publication Data
US 2012/0217793 A1 Aug. 30, 2012

(51) Int. Cl.
*B60K 7/00* (2006.01)

(52) U.S. Cl.
USPC .......................................... 180/65.51; 180/55

(58) Field of Classification Search
USPC ................ 180/55, 56, 58, 60, 62, 65.51, 65.6
See application file for complete search history.

(56) References Cited

U.S. PATENT DOCUMENTS

| | | | |
|---|---|---|---|
| 6,148,940 A | 11/2000 | Hokanson et al. | |
| 6,247,233 B1 * | 6/2001 | Hinton et al. | 29/894.3 |
| 6,588,538 B2 * | 7/2003 | Hinton et al. | 180/372 |
| 6,651,762 B1 * | 11/2003 | Hokanson et al. | 180/65.51 |
| 7,147,073 B2 * | 12/2006 | Mollhagen | 180/65.51 |
| 8,145,384 B2 * | 3/2012 | Murahashi et al. | 701/36 |
| 8,327,969 B2 * | 12/2012 | Rousseau | 180/294 |
| 2009/0283345 A1 * | 11/2009 | Kabrick et al. | 180/65.51 |
| 2010/0147631 A1 * | 6/2010 | Rousseau | 187/250 |

FOREIGN PATENT DOCUMENTS

| | | |
|---|---|---|
| DE | 4236093 | 5/1994 |
| DE | 10330690 | 2/2005 |
| DE | 102005037726 | 2/2007 |
| DE | 10063167 | 10/2009 |
| WO | WO03065546 | 8/2003 |

* cited by examiner

*Primary Examiner* — Katy M Ebner
(74) *Attorney, Agent, or Firm* — Taft, Stettinius & Hollister, LLP; Stephen F. Rost, Esq.

(57) ABSTRACT

An axle tube comprising a dry section interposing a first wet section and a second wet section, the first and second wet sections housing a liquid lubricant, the dry section having an interior isolated from the liquid lubricant, at least one of the first and second wet sections includes a power train, and at least one of the first and second wet sections includes an electric motor, wherein the electric motor is at least partially received within the dry section, wherein a fluidic seal interposes the electric motor and the dry section, and wherein the electric motor is not rigidly mounted to the dry section.

18 Claims, 15 Drawing Sheets

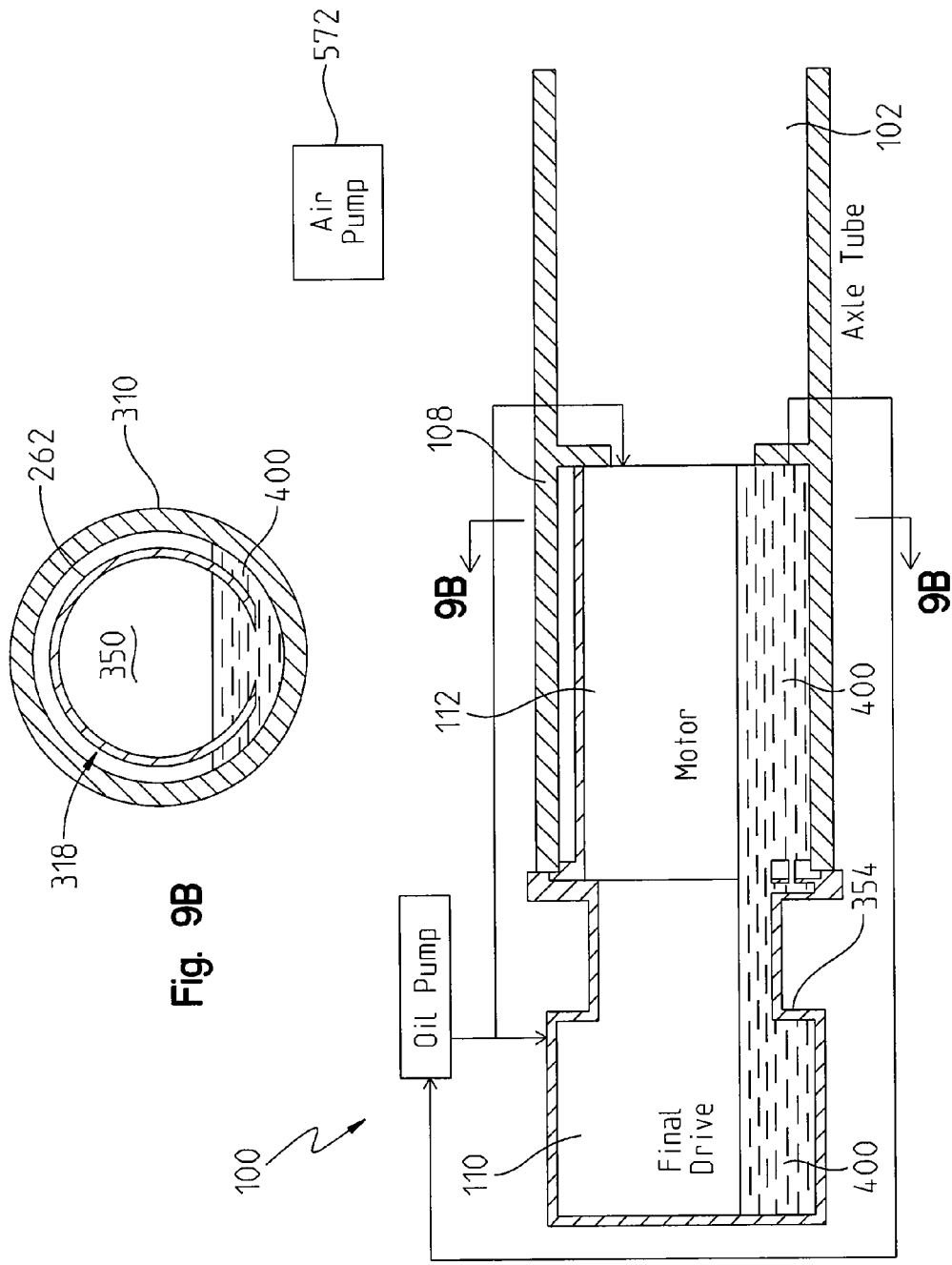

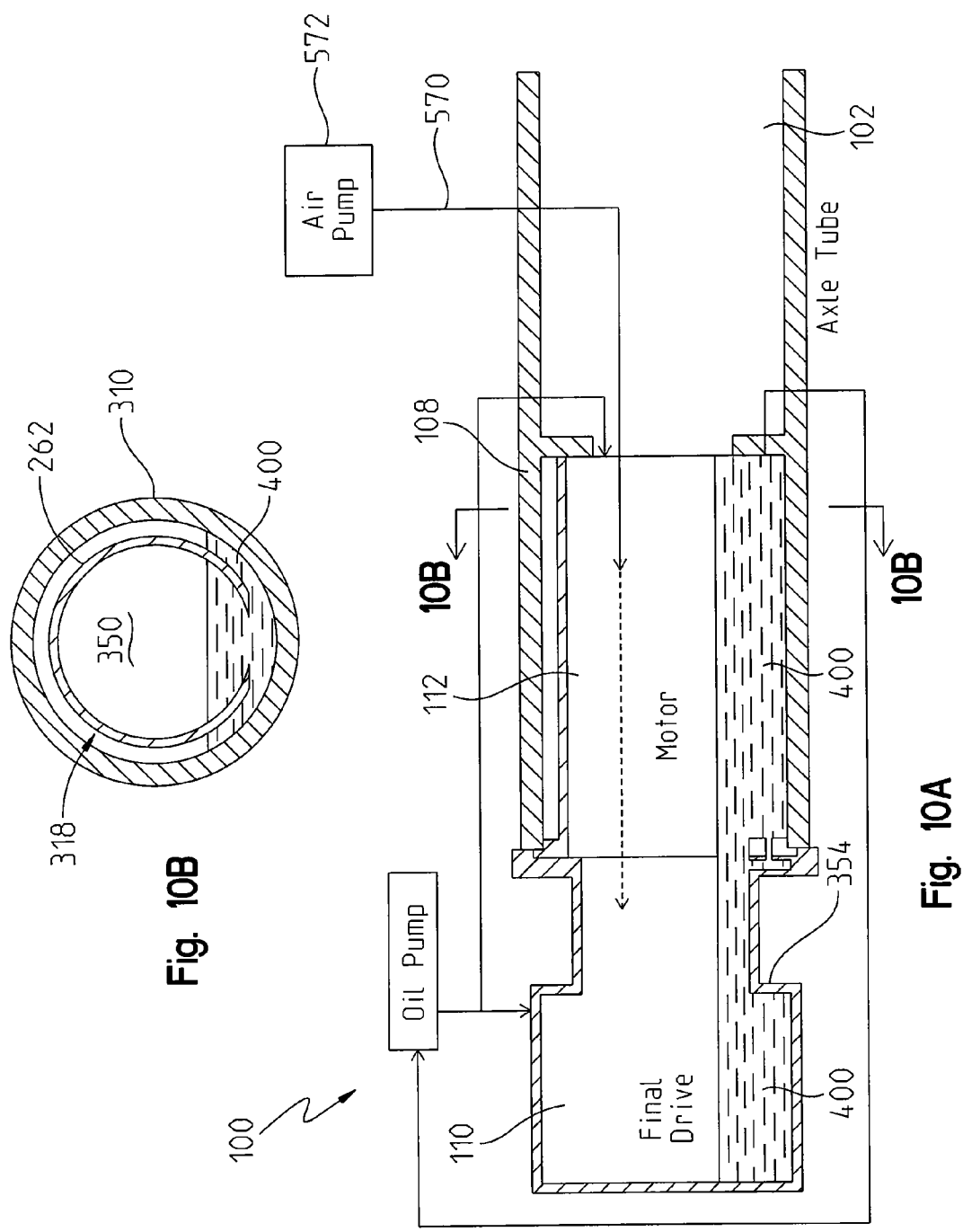

DRY AXLE CENTER SECTION

FIELD OF THE INVENTION

The present disclosure relates to managing an oil level in an axle or axle tube.

BACKGROUND OF THE INVENTION

Oil is used as a lubricant and coolant for the components in an axle or axle tube. This coolant prevents over-heating and operates to increase the life of the components within the axle. But using a coolant that is in intimate contact with the components in the axle causes some challenges for service-ability. One challenge for service-ability is the fact that at least some of the oil must be drained to access the internal components. Moreover, the internal components must be compatible with the coolant and be able to be soaked in the coolant without the coolant causing significant degradation. Further, electrical connections within the axle become bathed in oil and impart difficulty (i.e., oily and slippery) in maintaining and changing worn connections.

Additionally, mechanical contact of internal axle components to the axle frame across multiple points inherently transfers some vehicle load through the bearings and rotating components. As a result, this transfer of vehicle load necessitates that using more expensive bearings or shorter longevity of lesser expensive bearings.

Because of this mechanical contact to separate and keep oil out of certain axle areas is undesirable should it lead to load transfer into bearings as this will lead to more expensive bearings and/or shorter life of bearings.

SUMMARY

The exemplary embodiments of the present disclosure include an axle tube having at least one wet section and a dry section, where the two sections are mounted to one another, but the interior of the dry section is fluidicly isolated from the interior of the wet section.

It is a first aspect of the present disclosure to provide an axle tube comprising: (a) a first enclosure having an interior occupied by a first portion of a first electric motor including electrical connections; (b) a first housing within which is located a second portion of the first electric motor; (c) a first seal interposing the first enclosure and the first electric motor, the first seal inhibiting fluid flow between the first enclosure and the first electric motor, where the first housing is mounted to the first enclosure and, where the first electric motor is not rigidly attached to the first housing.

In a more detailed embodiment of the first aspect, the invention also includes the first enclosure having the interior occupied by a first portion of a second electric motor including electrical connections, a second housing within which is located a second portion of the second electric motor, a second seal interposing the first enclosure and the second electric motor, the second seal inhibiting fluid flow between the first enclosure and the second electric motor, where the second housing is mounted to the first enclosure and, where the second electric motor is not rigidly attached to the first housing. In yet another more detailed embodiment, the first electric motor includes an electrical connection end opposed from a drive shaft end, the first housing includes an orifice for throughput of the electrical connection end of the first electric motor and, the orifice is sized to inhibit complete throughput of the drive shaft end of the first electric motor. In a further detailed embodiment, the first housing includes a first orifice for throughput of at least the first portion of the first electric motor, the first housing includes a second orifice for throughput of at least a first portion of a second electric motor and, the first orifice is opposite the second orifice. In still a further detailed embodiment, the housing includes a through hole to concurrently access the first portion of the first electric motor and the first portion of the second electric motor. In a more detailed embodiment, the housing includes an air supply line coupled to the first electric motor and extending outside the housing. In a more detailed embodiment, the housing includes a lubricant supply line coupled to the first electric motor and extending outside the housing. In another more detailed embodiment, the housing includes an air supply line coupled to the first electric motor and extending outside the housing and, the housing includes a lubricant supply line coupled to the first electric motor and extending outside the housing. In yet another more detailed embodiment, the first enclosure is sealed.

It is a second aspect of the present invention to provide an axle tube comprising a dry section interposing a first wet section and a second wet section, the first and second wet sections housing a liquid lubricant, the dry section having an interior isolated from the liquid lubricant, at least one of the first and second wet sections includes a power train, and at least one of the first and second wet sections includes an electric motor, wherein the electric motor is at least partially received within the dry section, wherein a fluidic seal interposes the electric motor and the dry section, and wherein the electric motor is not rigidly mounted to the dry section.

In a more detailed embodiment of the second aspect, the dry section is fluidicly separated from the interior of the first and second wet sections and, the dry section is sealed to egress of contaminants into its interior. In yet another more detailed embodiment, the dry section comprises a rectangular cross-section and, where at least one of the first wet section and the second wet section has a generally circular cross-section. In a further detailed embodiment, the dry section includes a pair of orifices opposite one another for accommodating partial throughput of two respective electric motors and, the dry section includes a third orifice providing access to the interior of the dry section after the electric motors are occupying the pair of orifices. In still a further detailed embodiment, the third orifice is occupied by at least one of an air supply line and a lubricant supply line in fluid communication with an interior of at least one of the two electric motors.

It is a third aspect of the present invention to provide a method of fabricating an axle tube, the method comprising: (a) including a dry section along the length of an axle tube when fabricating the axle tube, the axle tube fabricated to include a wet section housing a liquid lubricant and an electric motor, and an interior of the dry section is free from liquid lubricant from the wet section; and, (b) floating at least a portion of the electric motor upon a seal, the seal interposing the dry section and the electric motor, where the electric motor is not rigidly mounted to the dry section.

In a more detailed embodiment of the third aspect, the axle tube is fabricated to include at least two wet sections, the axle tube is fabricate so the dry section interposes at least two of the wet sections and, an interior of the dry section is fluidicly sealed from the at least two wet sections interposed. In yet another more detailed embodiment, the method further includes welding a housing to the dry section, the housing at least partially enclosing the electric motor and, where the electric motor, housing, and dry section cooperate to create a lubricant reservoir cavity. In a further detailed embodiment, the method further includes installing at least one of an air supply line and a lubricant supply line to the electric motor, the supply line being in fluid communication with an interior of the electric motors, wherein the supply line extends though the interior of the dry section and outside of the interior of the dry section.

BRIEF DESCRIPTION OF THE DRAWINGS

FIG. 9 is a schematic diagram showing the level of lubricant within the exemplary axle tube of FIG. 1 prior to start-up.

FIG. 10 is a schematic diagram showing the level of lubricant within the exemplary axle tube of FIG. 1 at start-up.

DETAILED DESCRIPTION

The exemplary embodiments of the present disclosure are described and illustrated below to encompass axle tubes and methods of managing fluid levels within an axle tube. Of course, it will be apparent to those of ordinary skill in the art that the exemplary embodiments discussed below are merely examples and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present invention.

Figure 1:
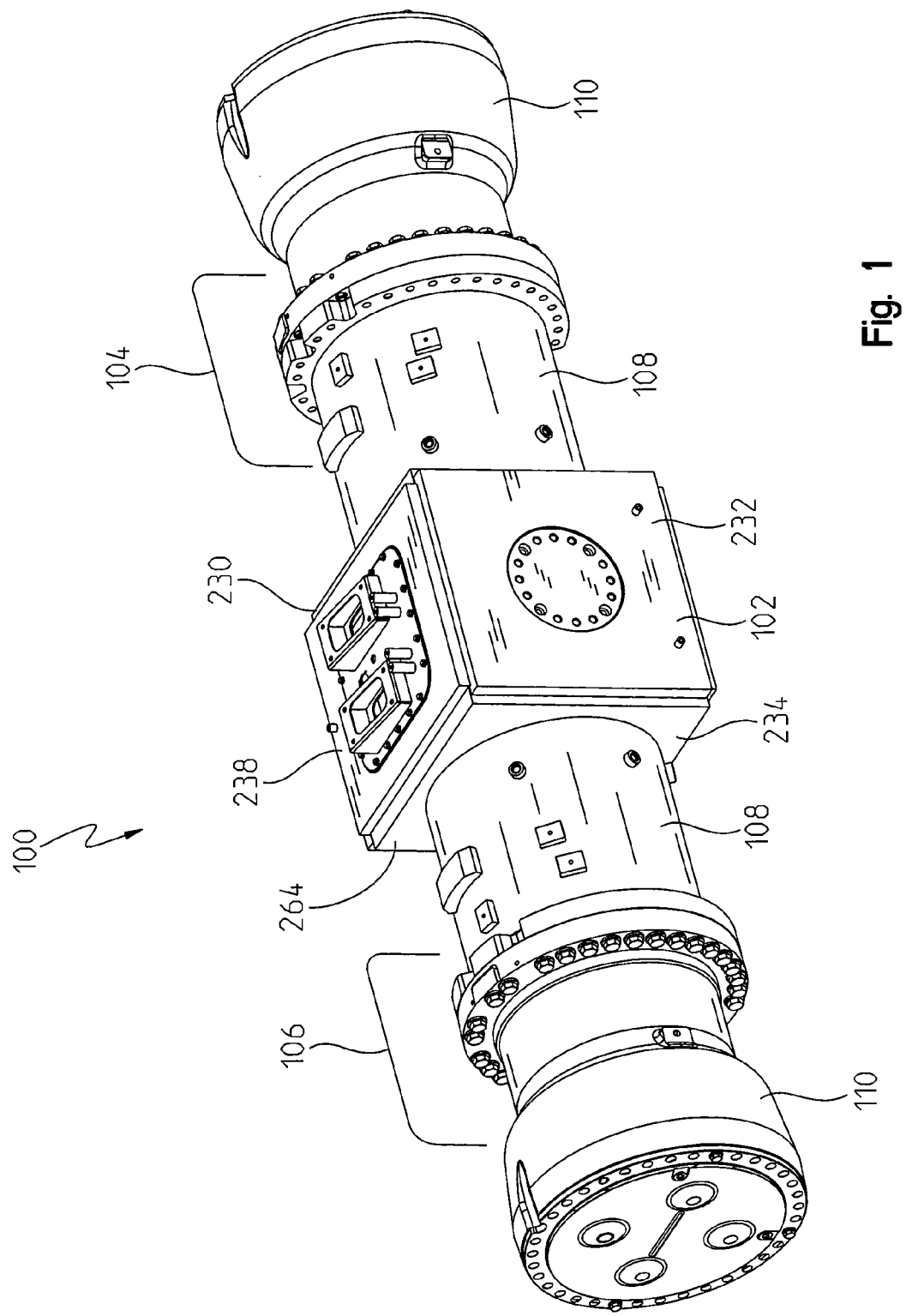
FIG. 1 is an elevated perspective view, from the top, of an exemplary axle tube in accordance with the instant disclosure, shown without external fluid and electrical lines.
Figure 2:
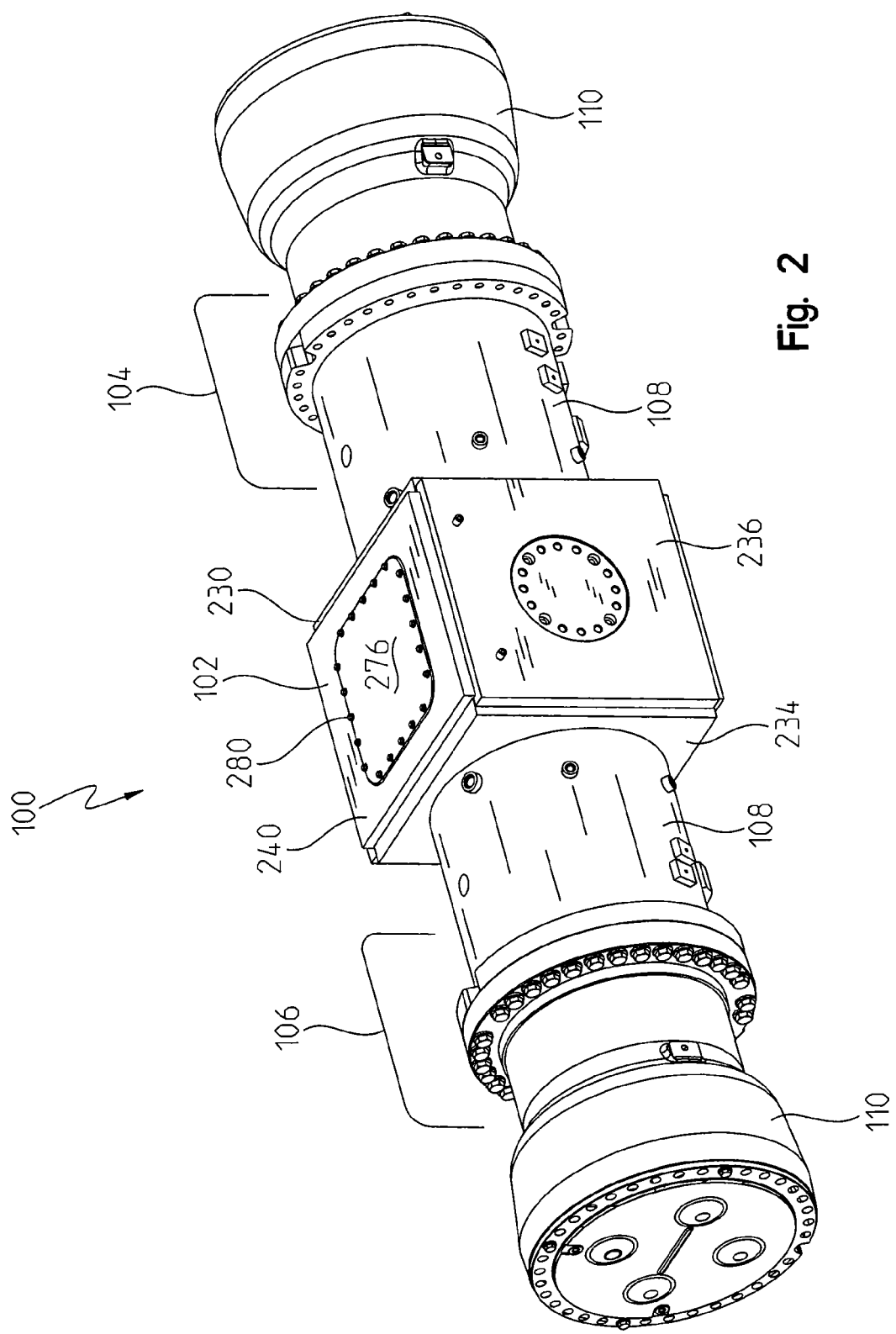
FIG. 2 is an elevated perspective view, from the bottom, of the exemplary axle tube in FIG. 1.
Figure 3:
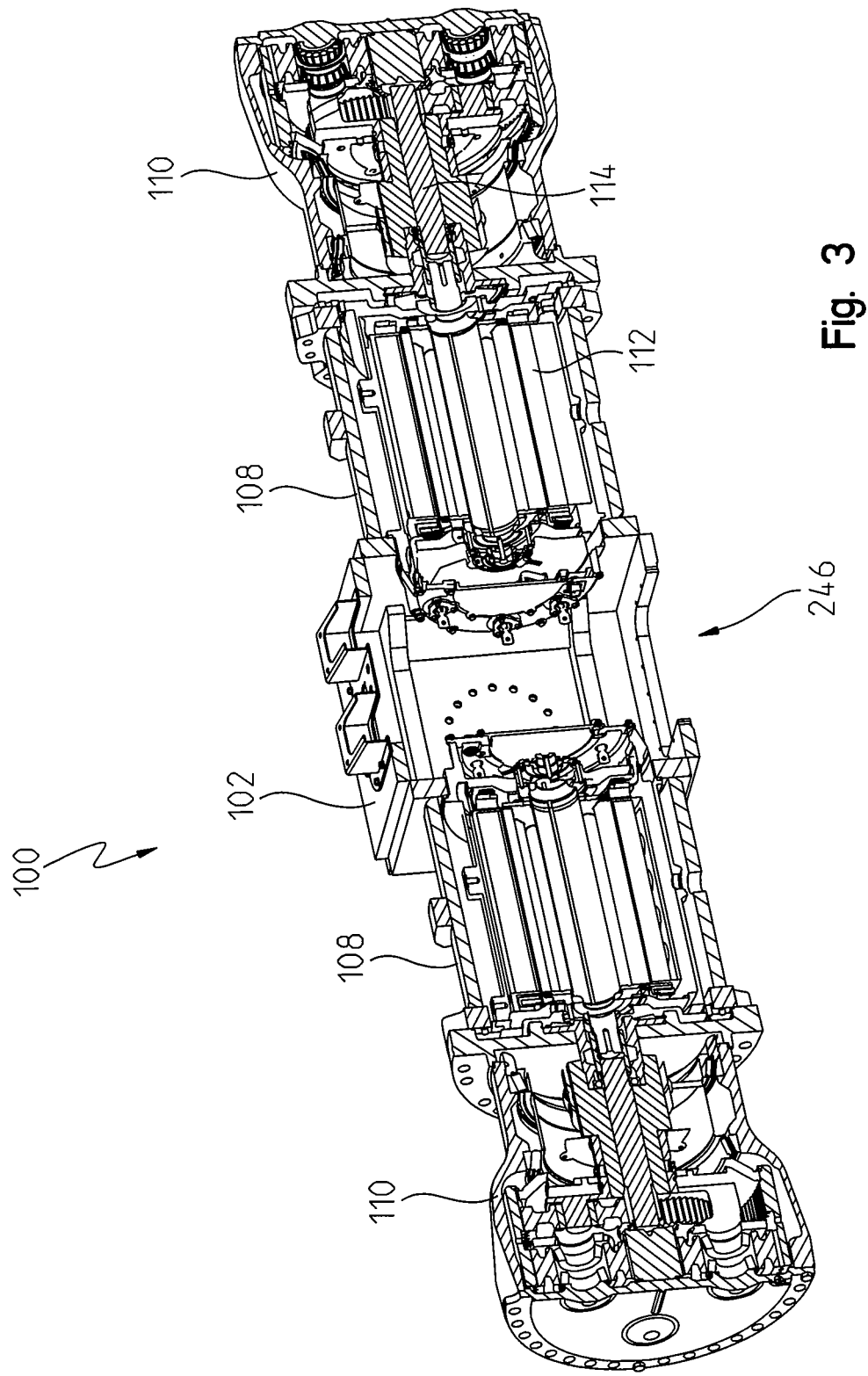
FIG. 3 is a cross-sectional view of the exemplary axle tube in FIG. 1.
Figure 4:
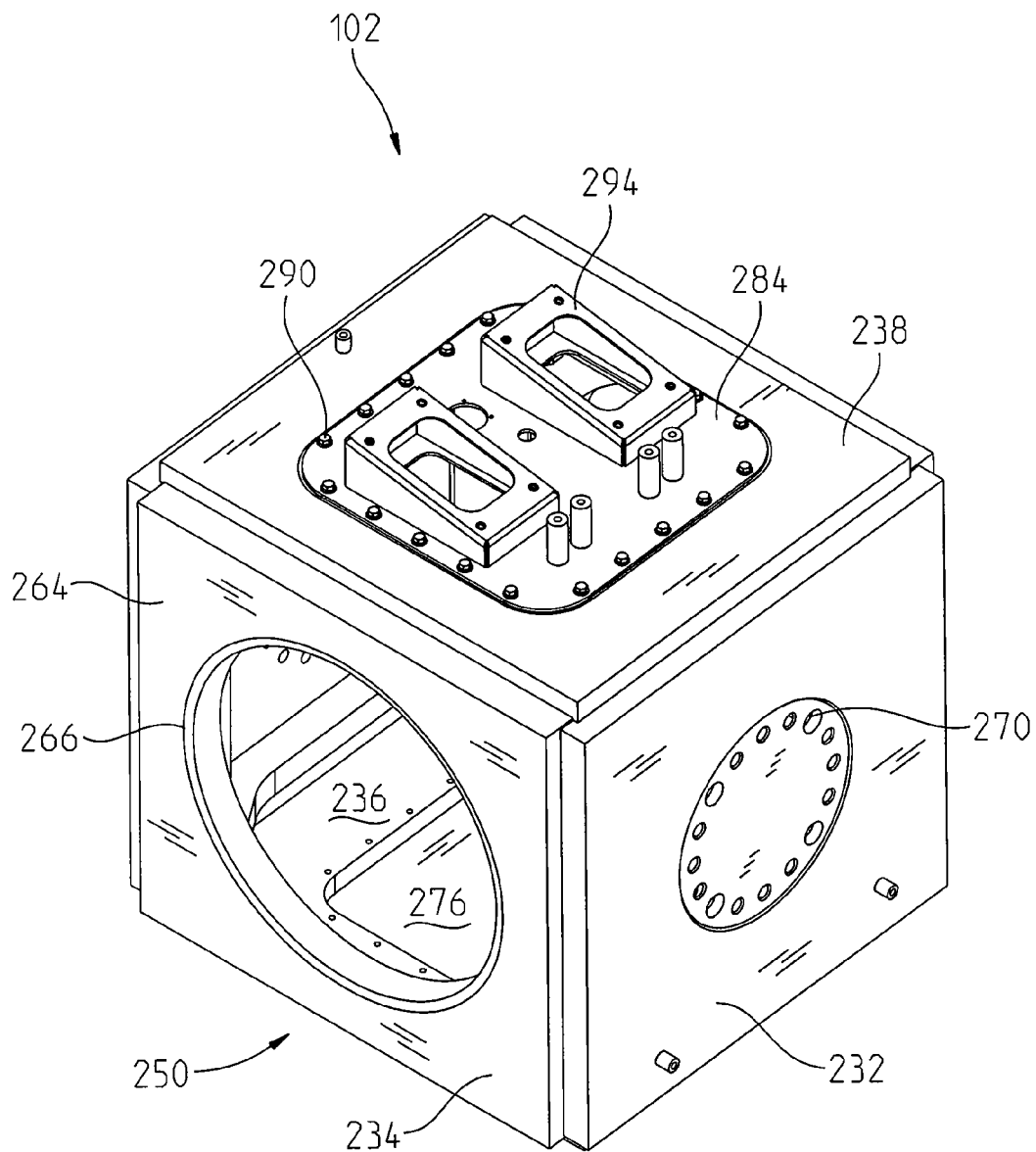
FIG. 4 is an elevated perspective view, from the top, of the exemplary dry center section of FIG. 1.
Figure 5:
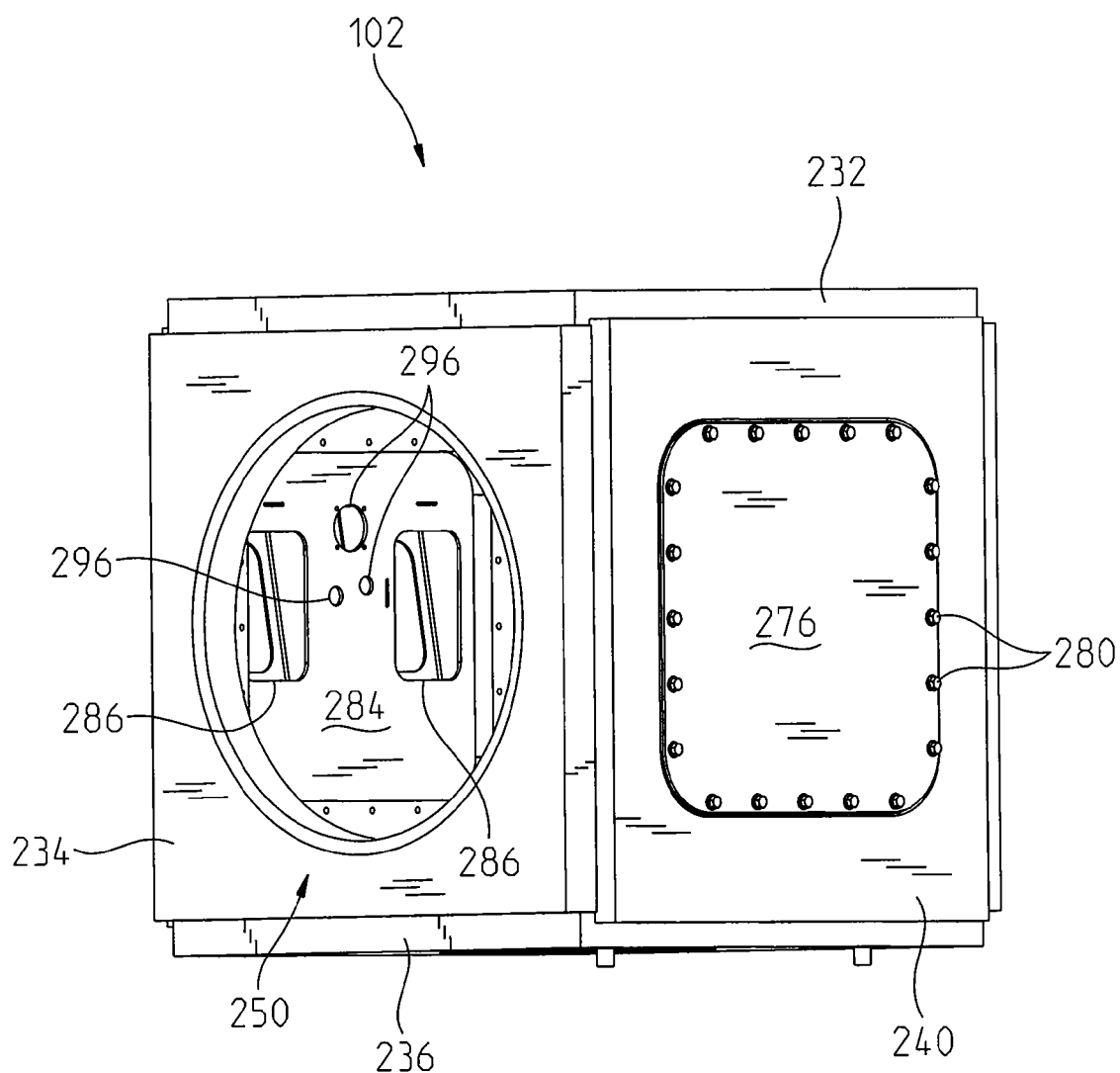
FIG. 5 is an elevated perspective view, from the bottom, of the exemplary dry center section of FIG. 4.
Figure 6:
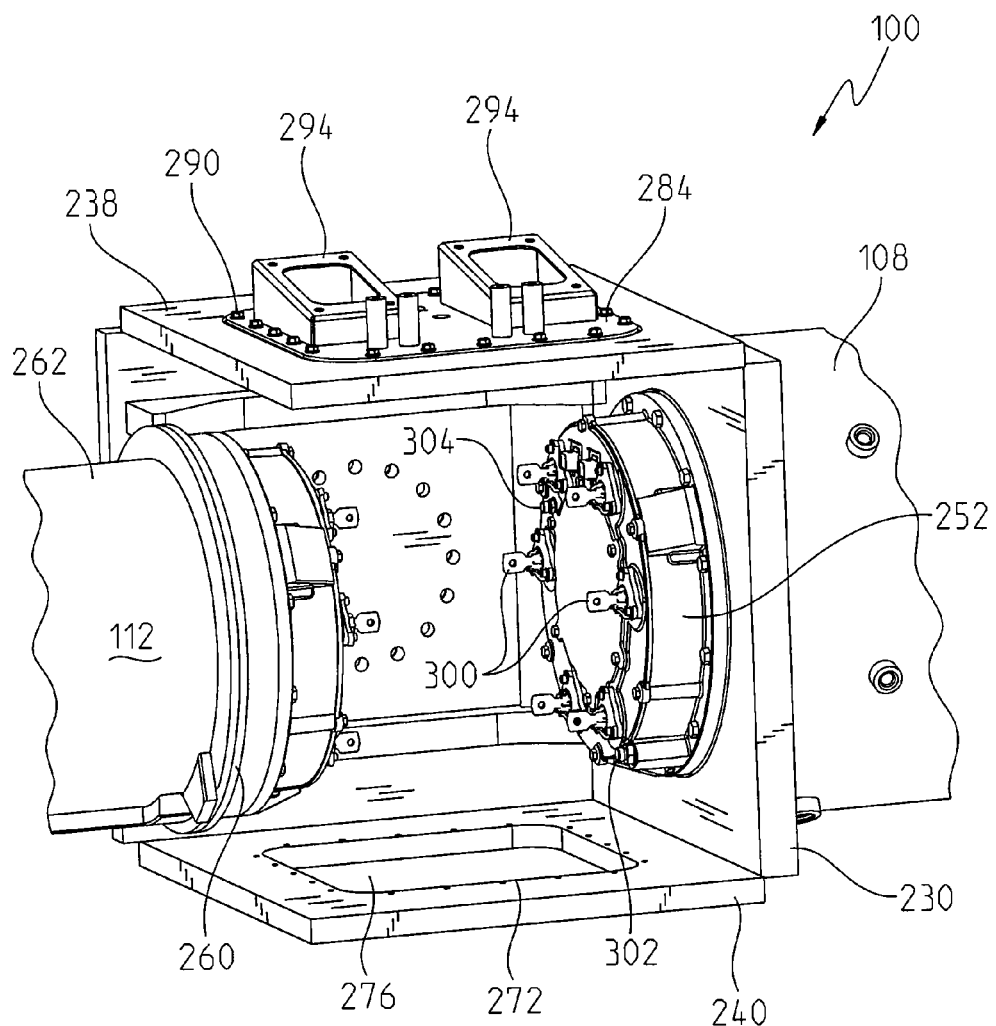
FIG. 6 is an elevated perspective view, from the front, of the exemplary dry center section of FIG. 1 without a pair of walls and showing the pair of electric motors mounted to the dry center section.

Referencing FIGS. 1-3, a first exemplary axle tube 100 (shown without external fluid hoses) includes a dry center section 102 and corresponding right and left wet sections 104, 106 mounted to opposing ends of the dry center section. In this exemplary embodiment, each right and left wet section 104, 106 includes two subsections 108, 110. The first subsection 108 is a motor subsection that houses the majority of an electric motor 112. The second subsection 110 is a transmission subsection and includes transmission components 114 operatively coupled to the electric motor 112. Both the right and left wet sections 104, 106 are sealed in order to retain oil concurrently lubricating and cooling the transmission components 114 and cooling the electric motor 112. Both of the wet sections 104, 106 include seals that are operative to retard the inflow of water and other contaminants.

Referring to FIGS. 1-6, the dry center section 102 comprises an enclosure formed by six rectangular walls 230, 232, 234, 236, 238, 240 that are mounted to one another. Each of the six walls 230, 232, 234, 236, 238, 240 corresponds to another of the remaining five walls so that corresponding pairs of walls are generally uniformly spaced apart and oriented in parallel. This orientation provides a box-shaped enclosure that defines a dry interior cavity 246.

The first corresponding pair of walls 230, 234 (right and left) each include a circular through hole 250 large enough to receive a dry portion 252 of an electric motor 112. As will be discussed in more detail hereafter, the vast majority of the electric motor 112 is housed within the motor subsection 108. Respective elastomeric ring seals 260 interposes an outer housing 262 of each electric motor 112 and an outside surface 264 of each wall 230, 234. In particular, the elastomeric ring seal 260 has a diameter that is greater than the diameter of the through hole 250 so that the ring seal circumscribes the through hole, but is mounted to the outside surface 264 of each wall 230, 234. In particular, the outside surface 264 includes a circular recess 266 that bounds the through hole 250 and provides a seat for a portion of the ring seal 260. It should be noted that the housing 262 of each electric motor 112 is concurrently mounted to the seal ring 260, but is not rigidly fastened to the dry center section 102. Rather, the electric motor 112 floats with respect to the dry center section 102 because of the flexibility of the seal rings 260 interposing the walls 230, 234 and the housing 262 of each electric motor 112.

The second corresponding pair of walls 232, 236 (front and back) are coupled to the right and left walls 230, 234 and to the third corresponding pair of walls 238, 240 (top and bottom). Each front and back wall 232, 236 includes a plurality of orifices 270 adapted to provide a mounting location for attaching the axle tube to a vehicle frame (not shown), thereby providing support to the center of the axle tube. The top and bottom walls 238, 240 each include a rounded, rectangular through hole 272. In this exemplary embodiment, the rounded, rectangular through hole 272 of the bottom wall 238 is closed off by a rounded rectangular pan 276 mounted to an exterior surface 278 thereof. In particular, the rounded rectangular pan 276 includes a plurality of orifices (not shown) adapted to receive threaded fasteners 280 that extend through the orifices and into holes of the bottom wall 240 in order to allow the pan to be coupled and uncoupled from the bottom wall. In contrast, the rounded, rectangular through hole 272 of the top wall 238 is not entirely closed off. Instead, a rounded rectangular pan 284 having a pair of elongated rectangular openings 286 is mounted to an outer surface of the top wall 238. As with the bottom pan 276, the top pan 284 includes a plurality of orifices (not shown) adapted to receive threaded fasteners 290 that extend through the orifices and into holes of the top wall 238 to couple and uncouple the top pan from the top wall. Extending from the top pan 284 and circumscribing the elongated rectangular openings 286 are adapter boxes 294. Each adapter box 294 receives a high voltage subassembly (not shown) that is pre-connected and fluidicly sealed in order to establish electrical communication from outside the dry center section 102 and into communication with the electric motors 112 partially located within the dry center section. The adapter boxes 294 also provide connection locations for the air, oil and low voltage lines (not shown) that connect to the electric motors 112. The top pan 284 also includes a plurality of secondary orifices 296 that interpose the adapter boxes 294.

The dry portion 252 of each electric motor 112 includes numerous connections that provide electrical and fluid communication to the internal components of the electric motor and the transmission components 114. Several electrical connections 300 are provided in order to supply electric current to the internal components. Those skilled in the art are familiar with the structure of electric motors and a corresponding detailed discussion of the internal components of each electric motor has been omitted only to further brevity. In addition to the electrical connections 300, the dry portion 252 also includes an oil supply fitting 302 near the bottom of the dry portion for introducing oil into the interior of the electric motor 112. And an air supply fitting 304 is also provided as part of the dry portion 252 near the top of the dry portion in order to introduce air into the interior of the electric motor 112.

Figure 7:
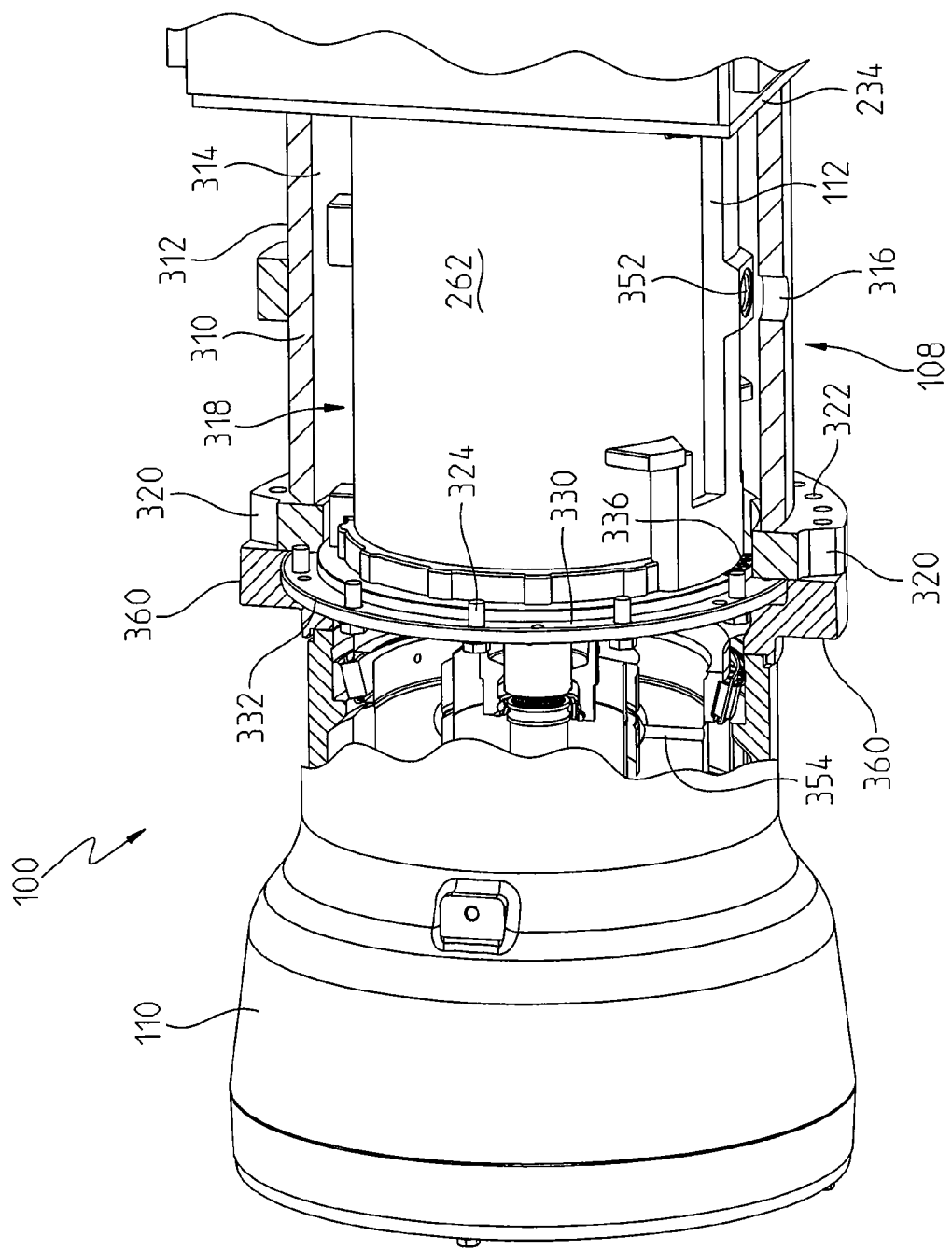
FIG. 7 is an elevated perspective view, taken from the electric motor side, of a cross-section taken with respect to the transmission subsection and the motor subsection housing to show the position of the electric motor with respect to adjacent components.
Figure 12:
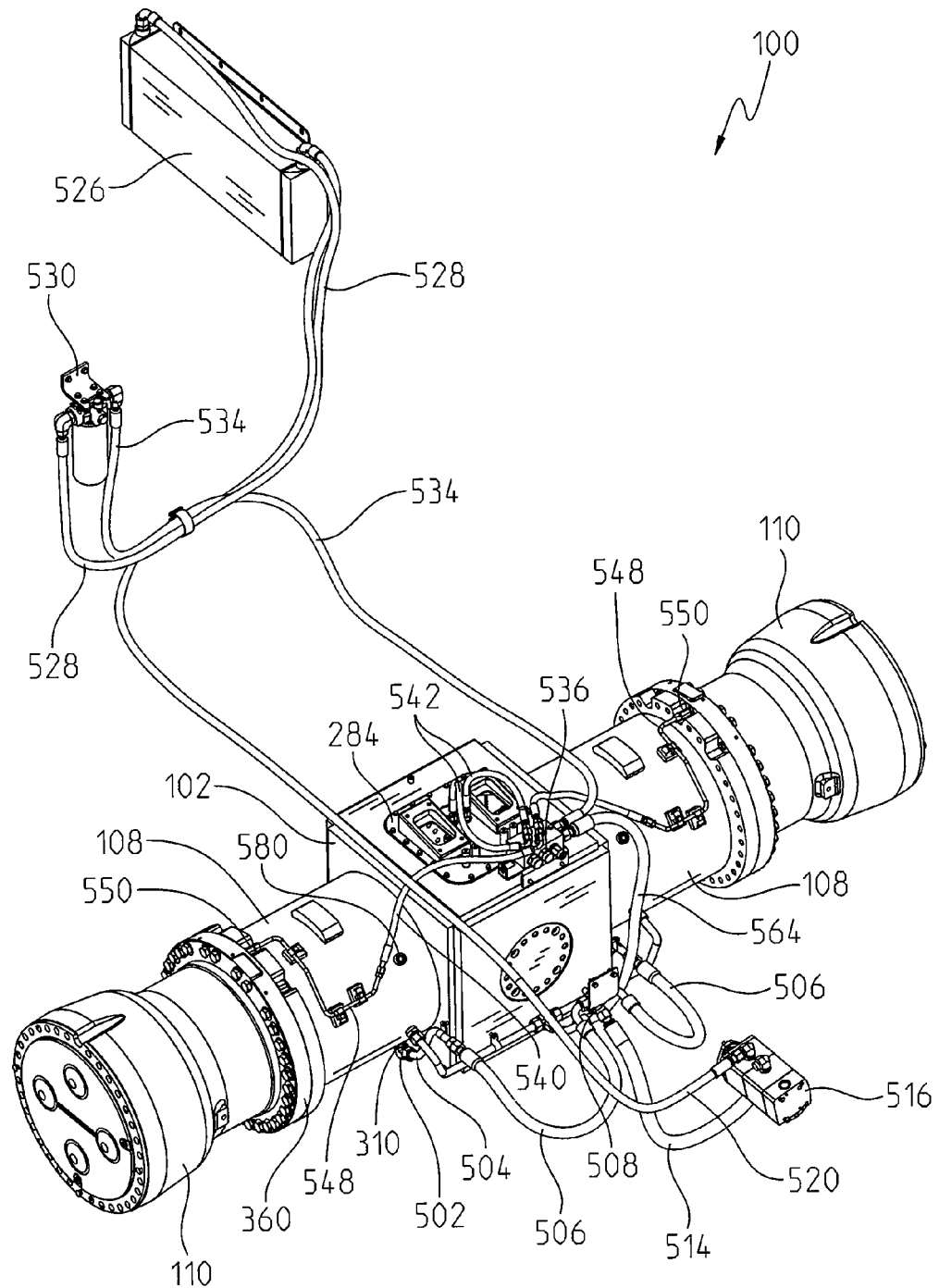
FIG. 12 is an elevated perspective view, from the top, of an exemplary axle tube in accordance with the instant disclosure shown with external fluid lines.
Figure 13:
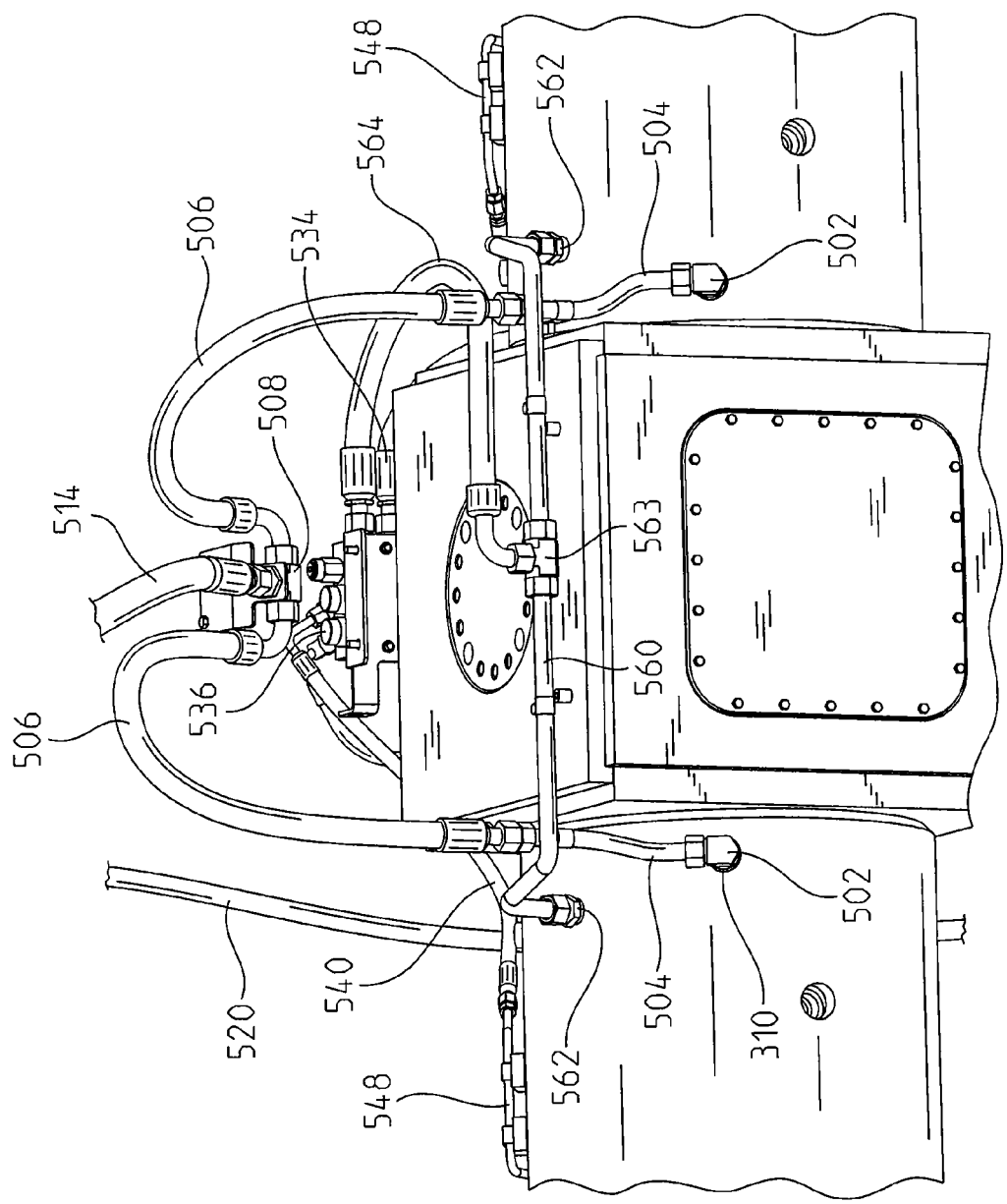
FIG. 13 is a magnified view of a portion of FIG. 12.

Referring to FIGS. 1 and 7, the remainder of the electric motor 112 is housed within a tube 310 of the motor subsection 108. The tube 310 comprises a dual ply 312, 314 cylinder having a series of fluid connections 316 that allow for fluid communication between the interior of the tube and an exterior of the tube. As will be discussed in more detail hereafter, the fluid connections 316 are coupled to hoses (see FIGS. 12 and 13). In between the interior ply 314 of the tube 310 and the exterior of the electric motor housing 262 is a reserve cavity 318 that is used to store excess oil when the axle tube 100 is in operation. Both tube 310 plies 312, 314 are welded at one longitudinal end to the outside surface 264 of respective walls 230, 234.

Figure 8:
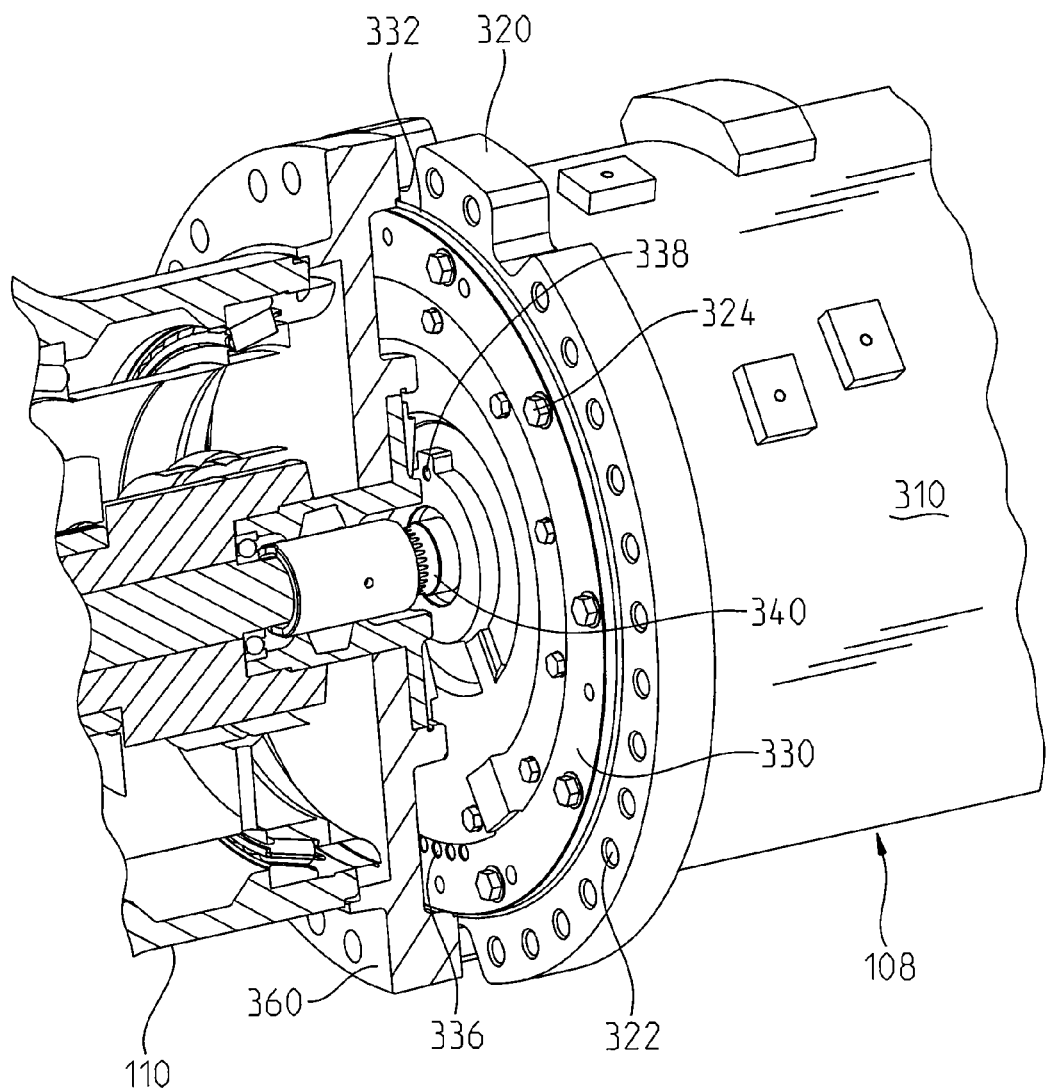
FIG. 8 is an elevated perspective view, taken from the transmission side, of a cross-section taken with respect to the transmission subsection to show the position of the electric motor and tube with respect to adjacent components.

Referencing FIGS. 7 and 8, the opposite longitudinal end of each tube 310 is welded to a circular flange 320 having a plurality of through holes. A first circumferentially outermost set of holes 322 receive fasteners in order to mount the flange 320 to a corresponding flange 360 of the transmission subsection 110. A second inner circumferential set of holes (not shown) receive fasteners 324 in order to mount the flange 320 to an end plate 330 of the electric motor 112. A gasket 332 interposes the flange 320 and the end plate 330 to ensure a fluid tight seal therebetween.

The end plate 330 includes several holes having varying functionality. A first set of holes receive the fasteners 324 in order to mount the electric motor 112 to the flange 320. A second set of through holes 336 provide communication across the end plate 330. As will be discussed in more detail hereafter, these holes 336 provide a pathway for fluid (e.g., coolant/lubricant, such as oil) to flow between the interior of the transmission subsection 110 and the reserve cavity 318. In order to manipulate the flow of fluid between the interior of the transmission subsection 110 and the reserve cavity 318, the end plate 330 also includes a through hole 338 elevated above an output shaft 340 from the electric motor 112 and above the second set of through holes 336. The through hole 338 is adapted to provide a pathway for fluid (e.g., air) to flow between the interior of the transmission subsection 110 and the electric motor housing 262. In this manner, as air pressurizes the interior of the transmission subsection 110 and the interior of the electric motor housing 262, coolant/lubricant is forced into the reserve cavity 318.

Figures 11A, 11B:
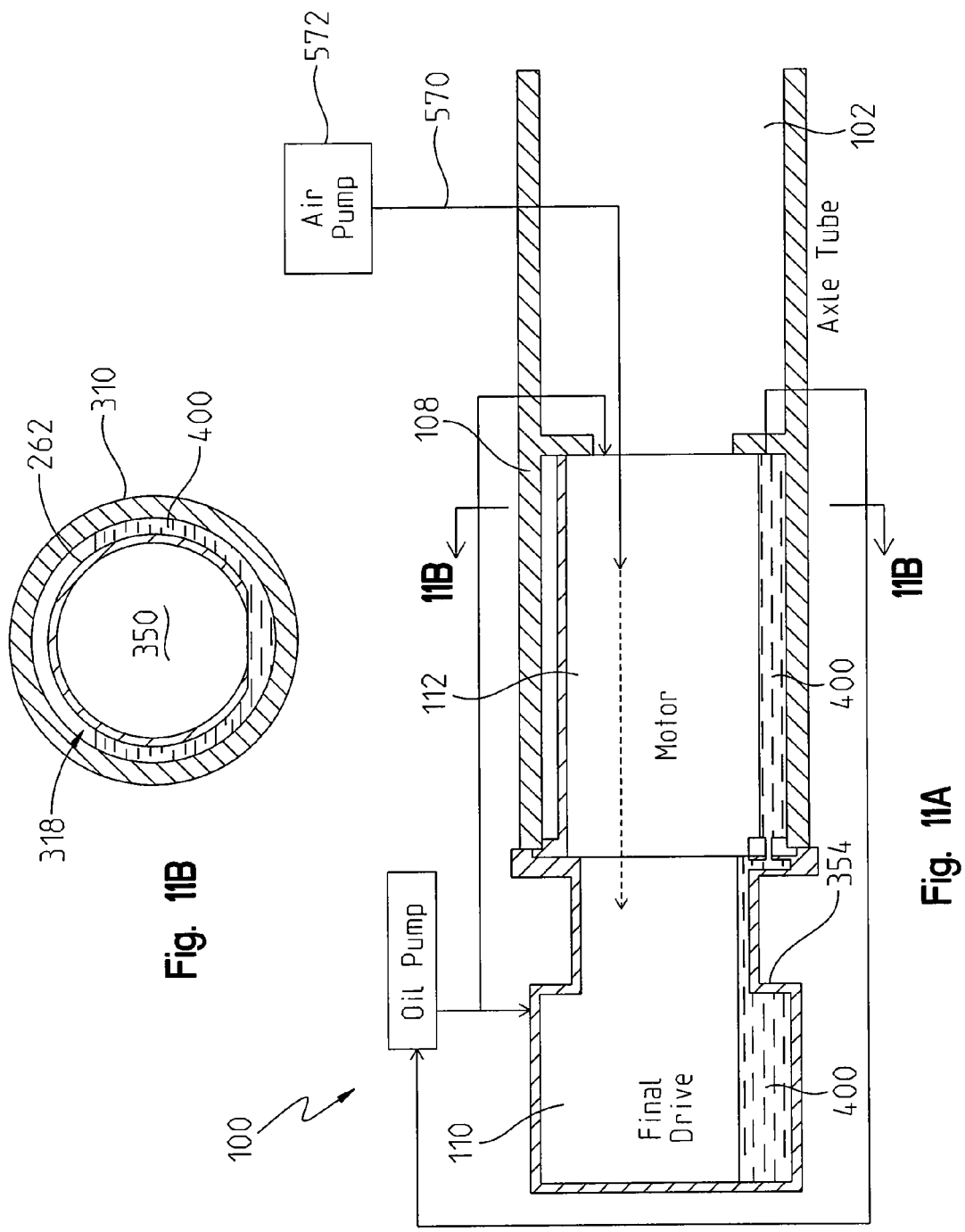
FIG. 11 is a schematic diagram showing the level of lubricant within the exemplary axle tube of FIG. 1 subsequent to start-up after the air pressure within the subsections is great enough to displace a greater amount of lubricant into a reserve cavity.

Referring to FIGS. 9-11, a schematic diagram shows the transmission subsection 110 and the motor subsection 108 coupled to one another and fluidicly sealed. In this manner, lubricant/coolant (e.g., oil) 400 is able to flow between the subsections 108, 110, but the subsections generally maintain the same aggregate volume (subsection 108 plus subsection 110) of lubricant/coolant. And the amount of lubricant/coolant 400 located within either subsection 108, 110 changes depending upon whether the axle tube 100 is operable or not.

Referencing FIGS. 7-9), initially, as the axle tube 100 becomes operable (upon receiving electric current to drive the electric motors 112 and an air supply, and upon being on level ground), the level of lubricant/coolant 400 within the subsections 108, 110 is generally the same. This universal level is the result of lubricant/coolant 400 freely flowing between the subsections through the second set of through holes 336 of the end plate 330 (see FIGS. 7 and 8). More specifically, the level of lubricant/coolant 400 is the same in the transmission subsection 110, the reserve cavity 318, and in the internal cavity 350 of the electric motor 112. But this universal level does not stay the same during operation of the axle tube 100.

Figure 14:
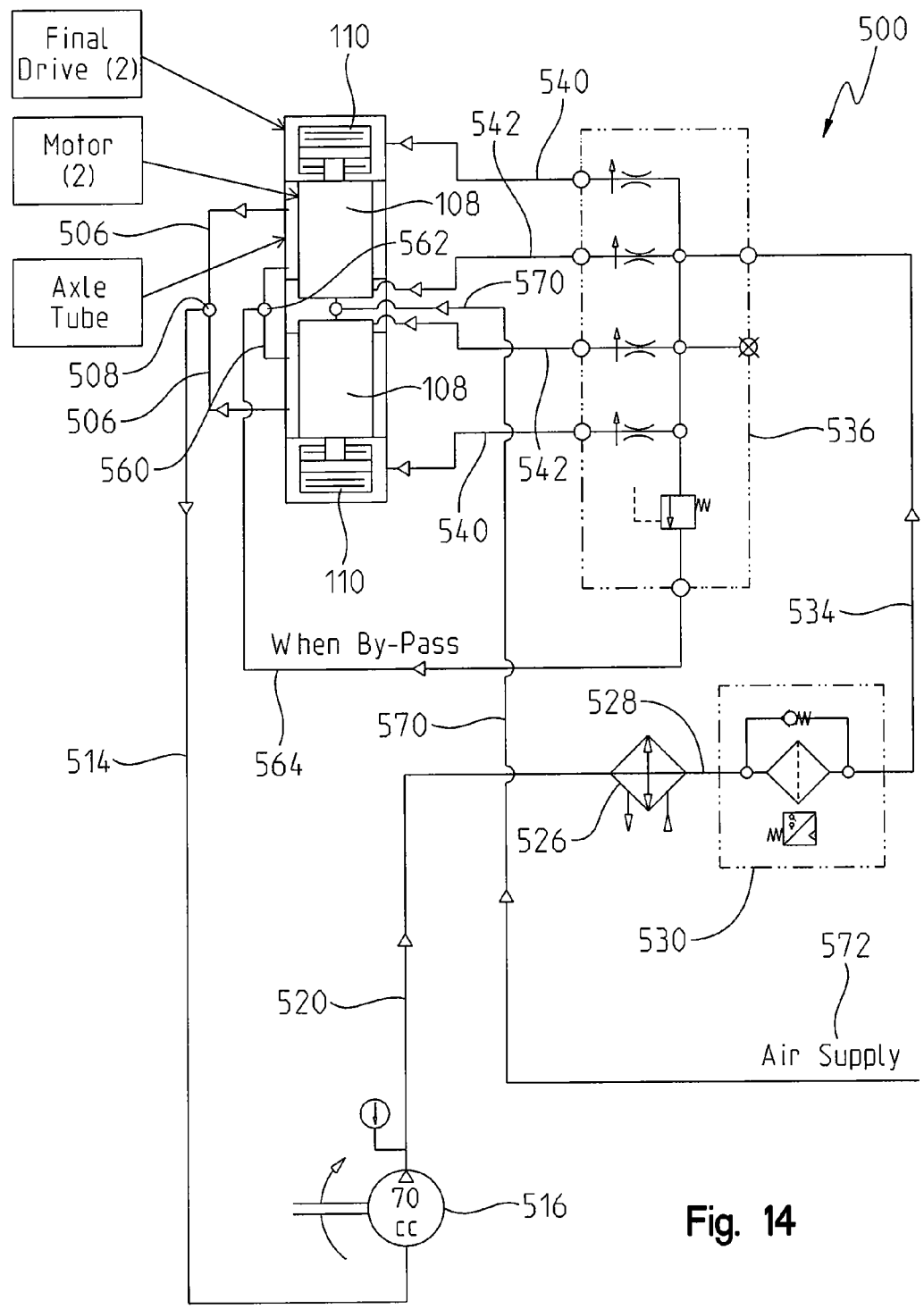
FIG. 14 is an exemplary flow diagram for the axle tube shown in FIG. 12.

Referring to FIGS. 6-8 and 10, after the axle tube 100 becomes operable (upon receiving electric current to drive the electric motors 112 and an air supply (e.g., air source 572 in FIG. 14), and upon being on level ground), air is fed into the internal cavity 350 of the electric motor 112 by way of the air supply fitting 304 within the dry portion 252. The air within the internal cavity 350 of the electric motor 112 builds in pressure based upon the air supply providing air above atmospheric pressure. In exemplary form, the air supply provides air at approximately forty pounds per square inch gauge (psig), which is reduced before it reaches the air supply fitting 304. The air pressure within the electric motor 112 may be, for example, between 0.4-1.0 psig to overcome the head pressure within the reserve cavity 318 and force oil out of the interior of the electric motor through a drain 352 at the base of the electric motor housing 262. Eventually, as the air drives out all or almost all of the lubricant 400 within the interior 350 of the electric motor 112, air begins to escape through the drain 352 and into the reserve cavity 318, where it is vented via a vent 580. In this manner, the air pressure within the interior 350 of the electric motor 112 may be self-regulated. In addition, as the air pressure builds within the internal cavity 250, the air escapes through the through hole 338 of the end plate 330 that is elevated above the output shaft 340. Thus, the air pressure across the through hole 338 is relatively the same. This means that the air pressure within the internal cavity 350 of the electric motor 112 is the same as the air pressure within the transmission subsection 110. Because of this equalization of pressure, the level of lubricant/coolant 400 across the through holes 336 is generally the same in the transmission subsection 110 and in the internal cavity 350 of the electric motor 112. But it should also be noted that the transmission subsection 110 includes a retainer wall 354 operative to retain a predetermined level of lubricant 400 within a portion of the transmission subsection that is above the level of lubricant across the through holes 336. And the level of lubricant within the reserve cavity 318 is also higher than the level of lubricant across the through holes 336.

Referencing FIG. 11, as the air pressure builds within the transmission subsection 110 and the internal cavity 350 of the electric motor 112, the higher pressure air begins to displace the lubricant/coolant 400 within these areas. As air displaces the lubricant/coolant 400, the corresponding level of lubricant/coolant 400 within the transmission subsection 110 and the internal cavity 350 drops and the lubricant/coolant is forced into the reserve cavity 318, thus causing the level of lubricant/coolant to drastically increase—well above the level within the transmission subsection and the internal cavity 350 of the electric motor 112. Eventually, the level of lubricant/coolant 400 within the transmission subsection 110 and the internal cavity 350 reaches an operating level as an equilibrium is established between the air pressure pushing on the lubricant/coolant and the pressure of the lubricant/coolant pushing back on the air. This operating level of lubricant/coolant 400 is determined, in large part, based upon the operating pressure of the air supply. However, those skilled in the art will realize that the operating level of lubricant/coolant 400 may change and, thus, the air pressure supplied by the air supply may also change to accommodate for these changes in the operating level of the lubricant/coolant.

When the axle tube 100 no longer is operable (not electric current to drive the electric motors 112 and no air supply, and upon being on level ground), the level of lubricant/coolant 400 within the subsections 108, 110 returns to being uniform (see FIG. 9). Specifically, without the air pressure forcing the lubricant/coolant 400 into the reserve cavity 318, the pressure of the lubricant/coolant within the reserve cavity operates to displace the air and become evenly distributed among the subsections 108, 110.

Referencing FIGS. 11-14, the lubricant/coolant 400 flows through a closed loop 500 that includes the interior of the subsections 108, 110 and a series of interconnected conduits. Each tube 310 includes an exit orifice defined by an exit orifice fitting 502 that is positioned near the lowest arcuate location on the tube. The exit orifice fitting 502 is mounted to a rigid outlet conduit 504 that is mounted to a flexible outlet conduit 506. In this way, the fitting 502 and conduits 504, 506 cooperate provide sealed flow for lubricant/coolant 400 exiting the reserve cavity 318 and flowing to the end of the outlet conduit 506. Each end of both flexible outlet conduits 506 is coupled to a T-fitting 508 operative to consolidate the dual flows into a single flexible line 514. This flexible line 514 is operatively coupled to a pump 516 that forces the lubricant/coolant 400 into a discharge flexible conduit 520 that carries the lubricant/coolant to be cooled and cleaned.

Lubricant/coolant 400 is carried by the flexible conduit 520 and directed into a radiator 526, which has a second fluid flowing therethrough to lower the temperature of the lubricant/coolant. After the lubricant/coolant 400 has been cooled, a radiator outlet conduit 528 conveys the lubricant/coolant to a filter 530. The filter 530 is operative to remove contaminants from the lubricant/coolant 400 and discharge clean lubricant/coolant into a feed conduit 534.

The feed conduit 534 is coupled to a manifold 536 that operates to distribute the lubricant/coolant 400 among several input conduits 540, 542. The first pair of input conduits 540 are each coupled to a rigid conduit 548 that is coupled to an entrance orifice fitting 550 that defines an entrance orifice. The entrance orifice fitting 550 is mounted to the flange 360 of the transmission subsection 110 and provides an egress point for lubricant/coolant 400 to flow into the interior of the transmission subsection. The second pair of input conduits 542 extends through the secondary orifices 296 (see FIG. 5) of the top pan 284 and into communication with the oil supply fitting 302 of the electric motor 112 (see FIG. 6), thereby providing an egress point for lubricant/coolant 400 to flow into the interior of the electric motor.

Direct fluid communication between the motor subsections 108 is made possible by a communication line 560 that is coupled to respective outlet fittings 562 mounted to the tube 310 at locations elevated with respect to the exit orifice fittings 502. In this manner, lubricant/coolant 400 is freely able to flow between one reserve cavity 318 (see FIG. 7) to the other reserve cavity. The communication line 560 comprises two mirror image sections of rigid line (that generally retains its shape) that are coupled to a box fitting 563. The box fitting 563 is coupled to a by-pass conduit 564 that is also coupled to the manifold 536. In this manner, if the input conduits 540, 542 become damaged or blocked, the manifold recognizes the resulting pressure difference (greater or lesser) and diverts the lubricant/coolant 400 from the manifold 536 into the by-pass conduit 564, where the lubricant/coolant is directed into the respective reserve cavities 318 using the communication line 560. Otherwise, the by-pass conduit 564 contains stagnant lubricant/coolant 400. And, as shown in part in FIGS. 10 and 11, an air supply conduit 570 provides air from an air source 572 to the air supply fitting 304 of the electric motor 112. Exemplary air sources include, without limitation, turbochargers and air compressors. In this exemplary embodiment, it is envisioned that the axle tube 100 is included as part of a larger machine having an internal combustion engine with a turbocharger, where at least a portion of the discharged, compressed air from the turbocharger is routed through the air supply conduit 570. It should also be noted that the tube 310 includes a vent 580 that may be operatively coupled to a vent line (not shown) in order to vent air within the reserve cavity 318 as the amount of lubricant/coolant 400 increases, and at the same time allow air into the reserve cavity as the amount of lubricant/coolant decreases.

Figure 15:
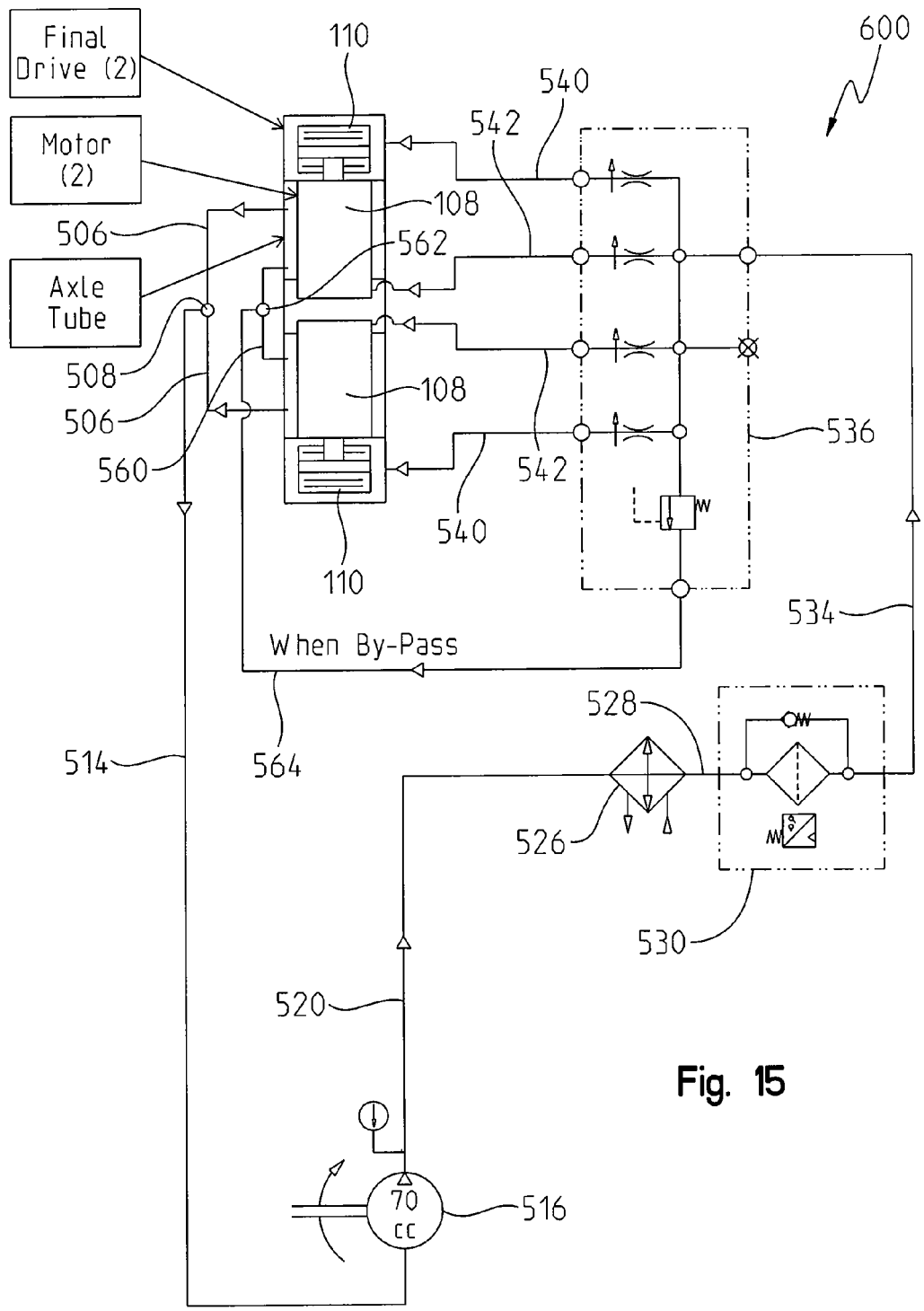
FIG. 15 is an exemplary flow diagram for an alternate exemplary axle tube.

Referring to FIG. 15, an additional diagram depict alternate closed loop flow path 600 for the lubricant/coolant 400. In this alternate closed loop 600, the conduits and components are the same as the first closed loop 500 with the exception of providing an air source 572 or an air supply conduit 570. In such a circumstance, the lubricant/coolant 400 within the subsections 108, 110 is not actively managed to direct more lubricant/coolant to the reserve cavities 318 when the electric motor 112 and transmission components are operational.

It should be noted that while the foregoing embodiment have discussed using compressed air to increase the level of lubricant/coolant 400 within the reserve cavity 318, it is also within the scope of the disclosure to apply suction to the top of the reserve cavity to pull additional lubricant/coolant within the reserve cavity. In such a circumstance, the vent 580 may be couple to a suction line (not shown) that operates to create a low pressure area within the reserve cavity 318 to raise the level of lubricant/coolant 400.

Following from the above description and invention summaries, it should be apparent to those of ordinary skill in the art that, while the methods and apparatuses herein described constitute exemplary embodiments of the present invention, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. An axle tube comprising:
a first enclosure having an interior occupied by a first portion of a first electric motor including electrical connections;
a first housing within which is located a second portion of the first electric motor;
a first seal interposing the first enclosure and the first electric motor, the first seal inhibiting fluid flow between the first enclosure and the first electric motor;
wherein the first housing is mounted to the first enclosure; and,
wherein the first electric motor is not rigidly attached to the first housing enclosure.

2. The axle tube of claim 1, further comprising:
the first enclosure having the interior occupied by a first portion of a second electric motor including electrical connections;
a second housing within which is located a second portion of the second electric motor;
a second seal interposing the first enclosure and the second electric motor, the second seal inhibiting fluid flow between the first enclosure and the second electric motor;
wherein the second housing is mounted to the first enclosure; and,
wherein the second electric motor is not rigidly attached to the first enclosure.

3. The axle tube of claim 1, wherein:
the first electric motor includes an electrical connection end opposed from a drive shaft end;
the first enclosure includes an orifice for throughput of the electrical connection end of the first electric motor; and,
the orifice is sized to inhibit complete throughput of the drive shaft end of the first electric motor.

4. The axle tube of claim 1, wherein:
the first enclosure includes a first orifice for throughput of at least the first portion of the first electric motor;
the first enclosure includes a second orifice for throughput of at least a first portion of a second electric motor; and,
the first orifice is opposite the second orifice.

5. The axle tube of claim 4, wherein the first enclosure includes a through hole to concurrently access the first portion of the first electric motor and the first portion of the second electric motor.

6. The axle tube of claim 4, wherein the first enclosure includes an air supply line coupled to the first electric motor and extending outside the first enclosure.

7. The axle tube of claim 4, wherein the first enclosure includes a lubricant supply line coupled to the first electric motor and extending outside the first enclosure.

8. The axle tube of claim 4, wherein:
the first enclosure includes an air supply line coupled to the first electric motor and extending outside the first enclosure; and,
the first enclosure includes a lubricant supply line coupled to the first electric motor and extending outside the first enclosure.

9. The axle tube of claim 4, wherein the first enclosure is sealed.

10. An axle tube comprising:
a dry section interposing a first wet section and a second wet section, the first and second wet sections housing a liquid lubricant, the dry section having an interior isolated from the liquid lubricant, at least one of the first and second wet sections includes a power train, and at least one of the first and second wet sections includes an electric motor, wherein the electric motor is at least partially received within the dry section, wherein a fluidic seal interposes the electric motor and the dry section, and wherein the electric motor is not rigidly mounted to the dry section.

11. The axle tube of claim 10, wherein:
the dry section is fluidicly separated from the interior of the first and second wet sections; and,
the dry section is sealed to retard egress of contaminants into its interior.

12. The axle tube of claim 11, wherein:
the dry section comprises a rectangular cross-section; and,
wherein at least one of the first wet section and the second wet section has a generally circular cross-section.

13. The axle tube of claim 10, wherein:
the dry section includes a pair of orifices opposite one another for accommodating partial throughput of two respective electric motors; and,
the dry section includes a third orifice providing access to the interior of the dry section after the electric motors are occupying the pair of orifices.

14. The axle tube of claim 13, wherein the third orifice is occupied by at least one of an air supply line and a lubricant supply line in fluid communication with an interior of at least one of the two electric motors.

15. A method of fabricating an axle tube, the method comprising:
including a dry section along the length of an axle tube when fabricating the axle tube, the axle tube fabricated to include a wet section housing a liquid lubricant and an electric motor, and an interior of the dry section is free from liquid lubricant from the wet section; and,
floating at least a portion of the electric motor upon a seal, the seal interposing the dry section and the electric motor, where the electric motor is not rigidly mounted to the dry section.

16. The method of claim 15, wherein:
the axle tube is fabricated to include at least two wet sections;
the axle tube is fabricate so the dry section interposes at least two of the wet sections; and,
an interior of the dry section is fluidicly sealed from the at least two wet sections interposed.

17. The method of claim 15, further comprising:
welding a housing to the dry section, the housing at least partially enclosing the electric motor; and,
wherein the electric motor, housing, and dry section cooperate to create a lubricant reservoir cavity.

18. The method of claim 15, further comprising:
installing at least one of an air supply line and a lubricant supply line to the electric motor, the supply line being in fluid communication with an interior of the electric motors, wherein the supply line extends though the interior of the dry section and outside of the interior of the dry section.

* * * * *